(12) United States Patent
Crawford et al.

(10) Patent No.: US 10,913,239 B1
(45) Date of Patent: Feb. 9, 2021

(54) VEIL BASED COMPOSITE STRUCTURE REPAIR

(71) Applicants: John A. Crawford, Miller Place, NY (US); Jerrell A. Nardiello, Hicksville, NY (US); John S. Madsen, Commack, NY (US); George W. Gilchrist, North Massapequa, NY (US); Charles J. Weizenecker, Stony Brook, NY (US)

(72) Inventors: John A. Crawford, Miller Place, NY (US); Jerrell A. Nardiello, Hicksville, NY (US); John S. Madsen, Commack, NY (US); George W. Gilchrist, North Massapequa, NY (US); Charles J. Weizenecker, Stony Brook, NY (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 318 days.

(21) Appl. No.: 15/622,653

(22) Filed: Jun. 14, 2017

(51) Int. Cl.
*B32B 7/12* (2006.01)

(52) U.S. Cl.
CPC .......... *B32B 7/12* (2013.01); *B32B 2262/101* (2013.01); *Y10T 428/24851* (2015.01); *Y10T 428/24959* (2015.01)

(58) Field of Classification Search
CPC ....... B29C 70/443; B29C 73/10; B29C 73/02; B29C 73/34
USPC .......................................................... 428/200
See application file for complete search history.

(56) References Cited

U.S. PATENT DOCUMENTS

| | | | |
|---|---|---|---|
| 2008/0026214 A1* | 1/2008 | Green et al. ............ | B32B 27/12 428/349 |
| 2014/0196833 A1* | 7/2014 | Byron ................... | B29C 70/443 156/98 |
| 2016/0039157 A1* | 2/2016 | Huang ................ | B29C 65/1477 156/94 |

\* cited by examiner

*Primary Examiner* — Betelhem Shewareged
(74) *Attorney, Agent, or Firm* — Tarolli, Sundheim, Covell & Tummino LLP

(57) ABSTRACT

One example includes a repair assembly that is comprised of a composite patch, an adhesive, and a veil. The adhesive is disposed between a composite structure that includes an anomaly to be repaired and the composite patch and the composite patch. The veil is disposed between the composite structure and the composite patch. The veil generates heat in response to electric power being applied to the veil, with the adhesive being cured with the heat generated with the veil to repair the composite structure including the anomaly.

10 Claims, 7 Drawing Sheets

VEIL BASED COMPOSITE STRUCTURE REPAIR

TECHNICAL FIELD

The disclosure relates generally to a composite structure, and more particularly to a veil based composite structure repair.

BACKGROUND

As manufacturers seek to make their products lighter while maintaining strength, they are increasingly turning to composite structures. Instead of metal that is pressed, bent, and extruded to obtain a desired shape, composite structures are typically constructed from sheets that are bound together with a resin. Composite structures are utilized in at least a portion of buildings, bridges, boat hulls, automotive, sporting goods, swimming pool panels, race car bodies, shower stalls, bathtubs, storage tanks, imitation granite and cultured marble sinks, and countertops. More advanced examples utilizing composite structures include spacecraft and aircraft that are subject to demanding environments. An example of such a composite that is used in spacecraft and aircraft is carbon fiber reinforced polymer. Carbon fiber reinforced polymer is constructed from woven sheets of carbon fibers that are bound together with a thermoset resin adhesive, such as epoxy.

SUMMARY

In one example, a repair assembly is comprised of a composite patch, an adhesive, and a veil. The adhesive is disposed between a composite structure that includes an anomaly to be repaired and the composite patch and the composite patch. The veil is disposed between the composite structure and the composite patch. The veil generates heat in response to electric power being applied to the veil, with the adhesive being cured with the heat generated with the veil to repair the composite structure including the anomaly.

In another example, a method is provided. The method comprises disposing a veil between a composite structure that includes an anomaly to be repaired and a composite patch. The method further comprises disposing an adhesive between the composite structure that includes an anomaly to be repaired and the composite patch. The method further comprises applying electric power to the veil to generate heat between the composite structure that includes an anomaly to be repaired and the composite patch until the adhesive is cured to repair the anomaly in response to the heat being generated with the electric power being applied to the veil.

In yet another example, a system is comprised of a composite patch, an adhesive, a veil, a vacuum bag, and a curing controller. The adhesive is disposed between a composite structure that includes an anomaly to be repaired and the composite patch. The veil is disposed between the composite structure and the composite patch, the veil generating heat in response to electric power being applied to the veil, with the adhesive being cured with the heat generated with the veil to repair the composite structure including the anomaly. The vacuum bag is affixed to the composite structure over the veil, the adhesive, and the composite patch, the vacuum bag maintaining a vacuum over the veil, the adhesive, and the composite patch while the heat is generated with the electric power being applied to the veil. The curing controller monitors a temperature of the adhesive and controls the heat being generated with the electric power being applied to the veil in response to the monitored temperature.

DETAILED DESCRIPTION

The present examples repair a composite structure via application of internal heat. To achieve such a repair, a repair assembly is disclosed herein that includes a composite patch, an adhesive, and a veil. The veil is disposed between two layers of adhesive, one layer against the composite structure that includes an anomaly to be repaired and the other adhesive layer against the composite patch. The veil is disposed between the composite structure and the composite patch, the veil generating heat in response to electric power being applied to the veil, with the adhesive being cured with the heat generated with the veil to repair the composite structure including the anomaly.

The repair assembly reduces stress in a damaged area or anomaly of the composite structure. Repairs sometimes utilize a heating mat that is disposed on top of a repair patch that is applied to the anomaly. The repair patch sometimes includes a composite structure similar to or the same as the composite structure being repaired and a thermoset resin. The heating mat is coupled to an electric power supply that results in the heating mat generating heat external to the repair patch. Such heat cures the repair patch, thus repairing the composite structure. Alternately, instead of utilizing the heating mat to generate heat, the composite structure under repair is sometimes placed into an autoclave that generates the heat to cure the repair patch.

A problem with both the heating mat and autoclave based schemes for repairing the composite structure is difficult heat control. Maintaining temperatures in a relatively tight temperature window within the repair patch results in a repair that is optimized for strength. However, maintaining temperatures in the relatively tight temperature window within the repair patch is difficult. To overcome such heating schemes that are difficult to maintain in the relatively tight temperature window, the veil brings the heat source closer to the adhesive than is provided by the heating mat or the autoclave, allowing for more precise control of the heat being applied to the adhesive and overcoming the deficiencies discussed above, while not exposing the parent composite structure to temperatures above its design service temperature.

Figure 1:
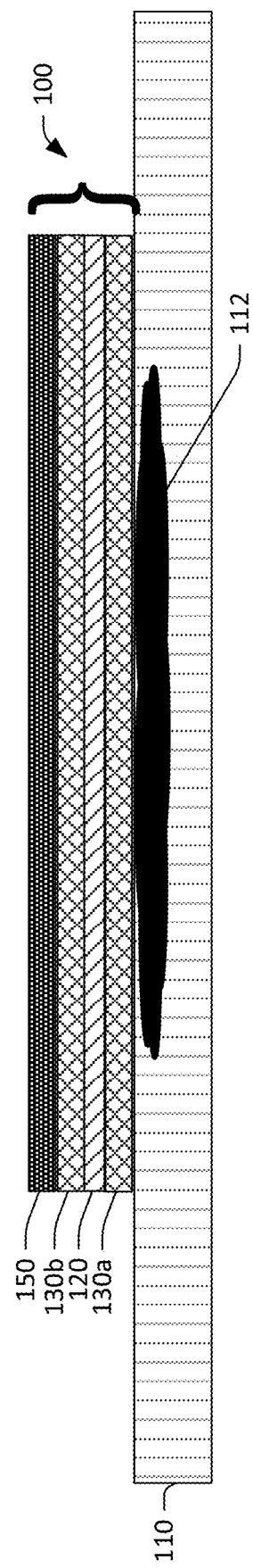
FIG. 1 illustrates a cross sectional view of an example repair assembly to repair to a composite structure.

FIG. 1 illustrates a cross sectional view of an example repair assembly 100 to repair a composite structure 110. The repair assembly 100 includes a veil 120, two adhesive layers 130a and 130b, and a composite patch 150. The repair assembly 100 is utilized to repair an anomaly 112 within the composite structure 110.

The composite structure 110 is a material made from two or more constituent materials with significantly different physical or chemical properties that, when combined, produce a material with characteristics different from the individual components. The individual components of the composite structure 110 remain separate and distinct within the finished composite structure 110. The composite structure 110 is the type that is utilized in at least a portion of buildings, bridges, boat hulls, automotive, sporting goods, swimming pool panels, race car bodies, shower stalls, bathtubs, storage tanks, imitation granite and cultured marble sinks, and countertops. More advanced examples utilizing the composite structure 110 include spacecraft and aircraft that are subject to demanding environments. Examples of the composite structure 110 include fiber reinforced polymer (e.g., carbon fiber reinforced polymer), fiberglass, glass-reinforced plastic, thermoplastic composites, short fiber thermoplastics, long fiber thermoplastics, long fiber-reinforced thermoplastics, or any other composite structure that includes a material made from two or more constituent materials with significantly different physical or chemical properties that, when combined, produce a material with characteristics different from the individual components.

The composite structure 110 includes the anomaly 112 therein. This anomaly 112 is a result of any number of different types of damage that has occurred to the composite structure 110. For example, the anomaly 112 is a result of an object striking the composite structure 110, the composite structure 110 being bent beyond a recoverable state, heat damage, or any other anomaly that weakens the composite structure 110. The anomaly 112 is illustrated as being at approximately half a height of the composite structure 110, however an anomaly 112 may be at a lesser depth and/or at a greater depth, while still weakening the composite structure 110 and needing repair. In an example, the anomaly 112 occurs through the composite structure from a top surface through to the bottom surface of the composite structure 110. Likewise, the anomaly may be at a lesser width and also at a greater width, while still weakening the composite structure 110 and needing repair. The repair assembly 100 repairs anomalies 112 of any depth and of any width.

To repair the anomaly 112 within the composite structure 110, the repair assembly 100 includes the veil 120 (e.g., a carbon based random mat). The veil 120 is disposed on the composite structure 110. The veil 120 is comprised of an electrically conductive material that is permeable to permit adhesive to pass through the veil 120 and adhere to the composite structure 110. In an example, the veil 120 is a sheet approximately 5 nm in thickness with an area weight of approximately 4 g/m² up to 200 g/m². In an example, the veil 120 is a carbon fiber sheet that is coated with a metal (e.g., nickel coated carbon or copper & nickel coated carbon). In an example, the veil 120 includes a pre-applied fixative (e.g., glue) that allows for adhesion or placement application of the veil 120 on the composite structure 110. In an alternate example, a fixative can be applied to the composite structure 110 and the veil 120 can be affixed to the fixative applied to the composite structure 110. The veil 120 generates heat internal to the repair assembly 100 and in an area proximate to the veil 120 when electric power is applied thereto. This heat is generated in an adhesive bond line of a structural composite repair to provide direct energy input for integral heating for curing the repair. The veil 120 is not removed after the anomaly 112 is repaired, remaining within the repair assembly 100 after repair of the anomaly 112.

The repair assembly 100 further includes the two adhesive layers 130a and 130b (e.g., epoxy). The adhesive layers 130a and 130b are disposed on both sides of the veil 120. In an example, the adhesive layers 130a and 130b are pre-formed sheets of adhesive. In another example, the adhesive layers 130a and 130b are formed from a liquid adhesive that is applied (e.g., brushed and/or rolled on) on the veil 120. In another example where the adhesive layers 130a and 130b are a pre-formed sheet of adhesive, the adhesive sheet includes a fixative that allows for a peal-and-stick application of the pre-formed sheet of the adhesive. The adhesive layers 130a and 130b are cured with the heat generated by the veil 120 to bond the repair assembly 100 to the composite structure 110. In yet another example, the adhesive layers 130a and 130b are pre-impregnated at a time of manufacture into the veil 120 or pre-impregnated at a time of manufacture into the composite patch 150. Such pre-impregnation simplifies application of such combined components to the composite structure 110.

The composite patch 150 of the repair assembly 100 is disposed on the adhesive layer 130b, and is disposed on the additional veil 140 when the additional veil 140 is being utilized. The composite patch 150 includes a material makeup that is the same as the material making up the composite structure 110. However, in an example the composite patch 150 includes a material makeup that is different than that of the composite structure 110. In an example, the composite patch 150 includes a pre-applied fixative that allows for a peal-and-stick application of the composite patch 150 on the adhesive layer 130a.

The veil 120 and the adhesive layers 130a and 130b are sized in accordance with a size of the anomaly 112 to be repaired. To maximize strength of the resultant repair of the anomaly 112, the adhesive layers 130a and 130b and the composite patch 150 are sized in accordance with sizing methodology to maximize strength of the resultant repair, with the veil 120 being sized to correspond to the size of the adhesive layers 130a and 130b and the composite patch 150. Moreover, although the veil 120 and the adhesive layers 130a and 130b are disclosed in an example arrangement above, the veil 120, the adhesive layers 130a and 130b may be arranged in different orders.

Because the veil(s) 120/140 remains within the repair assembly 100 after curing of the adhesive layers 130a and 130b and is integrated into the repair assembly 100, the veil(s) 120/140 not only provides integral heating for curing the adhesive layers 130a and 130b and performing thermography (shown in FIG. 4), but also improves the bond strength of the repair assembly 100 to the composite structure 110 by virtue of embedding the veil 120 in the adhesive layers 130a and 130b, and strengthens the bond line relative to a repair that does not include the veil 120.

Figure 2:
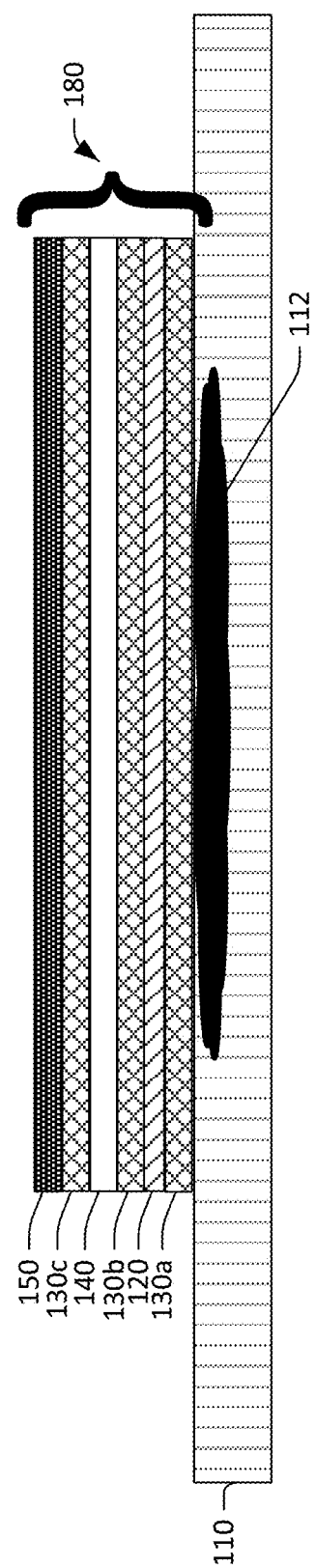
FIG. 2 illustrates a cross sectional view of another example repair assembly to repair the composite structure.

FIG. 2 illustrates a cross sectional view of another example repair assembly 180 to repair a composite structure 110. The repair assembly 180 includes the components of the repair assembly 100 and further includes another veil 140, and a third adhesive layer 130a. The third adhesive layer 130a is disposed between the composite patch 150 and the veil 140, with the veil 140 being disposed between the third adhesive layers 130c and adhesive layer 130b.

The additional veil 140 is used in applications where the veil 120 does not produce enough heat to cure the adhesive layers 130a and 130b in FIG. 1, the additional veil 140 supplementing the heat produced with the veil 120. The additional veil 140 is disposed on the adhesive layer 130b.

The additional veil 140 can be constructed of a same material as veil 120 or of a different material than that included with veil 120. Although the veils 120/140 and the adhesive layers 130a-130c are disclosed in an example arrangement above, the veils 120/140 and the adhesive layers 130a-130c may be arranged in different orders.

Figure 3:
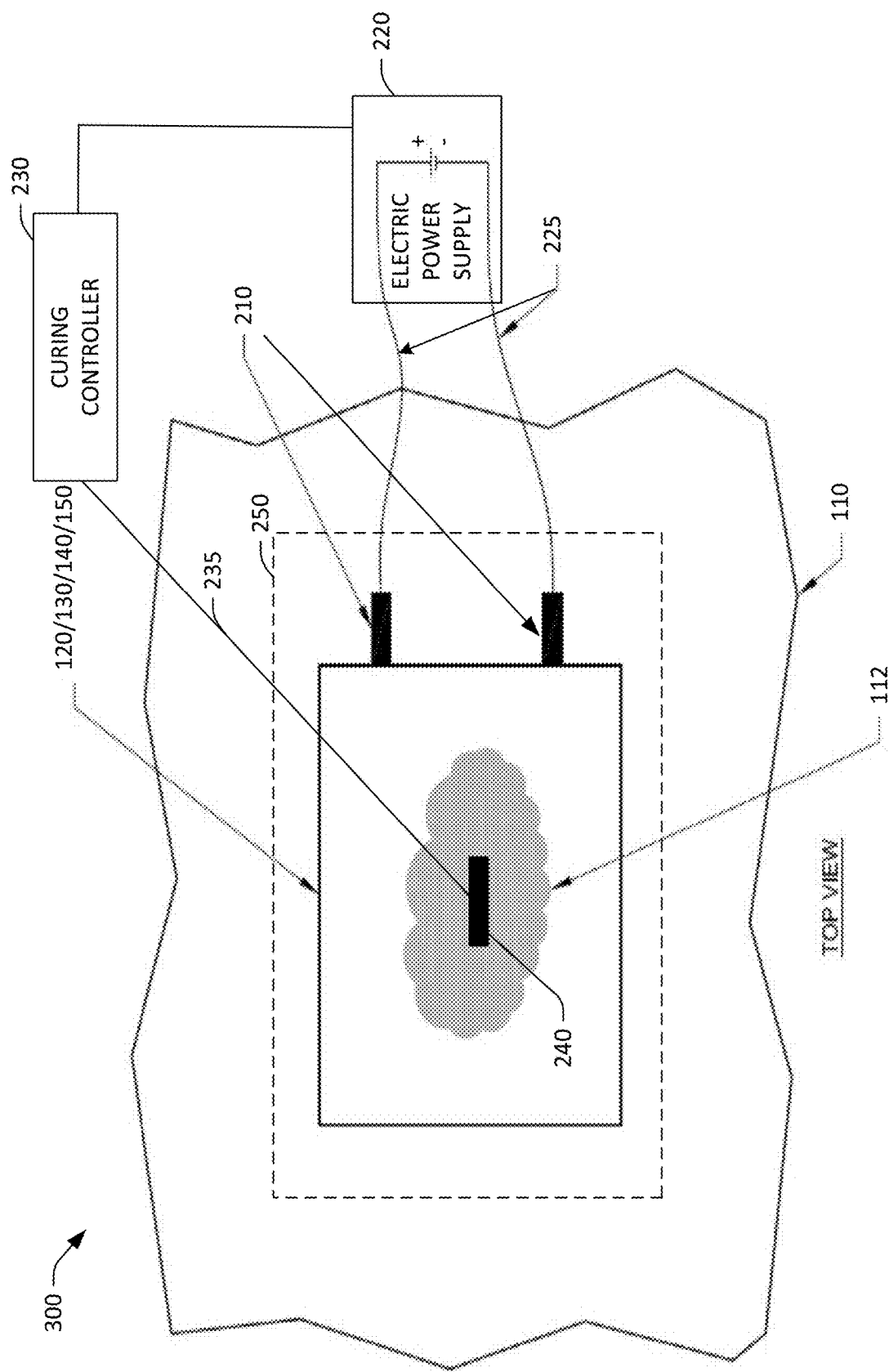
FIG. 3 illustrates a top view of an example system to repair the composite structure.

FIG. 3 illustrates a top view of an example system 300 to repair the composite structure 110. The system 300 includes a curing controller 230 coupled to a temperature sensor 240 via wire 235 and an electric power supply 220. The curing controller 230 controls the amount of heat being produced by the veil(s) 120/140. In order to control the amount of heat being produced by the veil(s) 120/140, the curing controller 230 controls the amount of electrical current being supplied to the veil(s) 120/140 from the electric power supply 220. The electric power supply 220 is coupled to the veil(s) 120/140 via electrodes 210 (e.g., copper electrodes) and wires 225 (e.g., copper wires).

The curing controller 230 controls the heat being produced by the veil(s) 120/140 in accordance with a temperature signal received from the temperatures sensor 240. The temperature signal generated by the temperature sensor 240 is proportional to the heat being generated by the veil(s) 120/140. The curing controller 230 controls the amount of electric power that is supplied to the veil(s) 120/140 in accordance with the temperature signal received from the temperature sensor 240. The curing controller 230 further controls a length of time that the adhesive layer 130 is cured. In an example, the curing controller 230 is pre-programmed with different cure times for different types of adhesive layers. This pre-programming allows a technician to select a particular type of adhesive layer from a list of available adhesive layers, and have the curing controller 230 automatically set a cure time for that particular type of adhesive layer selected.

The temperature sensor 240 may be disposed between any of the composite structure 110 and the veil 120, between the veil 120 and the adhesive layer 130, between the adhesive layer 130 and the additional veil 140, and between the additional veil 140 and the composite patch 150. The temperature sensor 240 is disposed proximate to the anomaly 112 to be repaired. Typically, heat for curing is generated by a heat blanket, inductive or radiant non-contact heaters, or an oven, with a temperature generated by such devices being monitored to control adhesive curing. However, depending upon a size of a repair being made the temperature near an adhesive does not coincide with the temperature of such devices. Such a discrepancy leads to a repair that is at best not maximized for strength, and at worst is subject to failure. Such disposition of the temperature sensor 240 provides for more accurate temperature sensing that leads to more accurate control over curing of the adhesive layer 130. More accurate control over the curing of the adhesive layer 130 leads to a repair that is maximized for strength.

The system 300 further includes a vacuum bag 250. This vacuum bag 250 is affixed (e.g., peal-and-stick) to the composite structure 110 over the repair components 120/130/140/150. Proximate to outer edges of the vacuum bag is pre-applied fixative (e.g., glue) that allows for a peal-and-stick application of the vacuum bag 250 on the composite structure 110. The vacuum bag 250 provides an air tight seal on the composite structure 110. A vacuum device (not shown) withdraws any air trapped under the vacuum bag 250 after its application to create a vacuum under the vacuum bag 250. This vacuum under the vacuum bag 250 facilitates curing of the adhesive layer 130.

Figure 4:
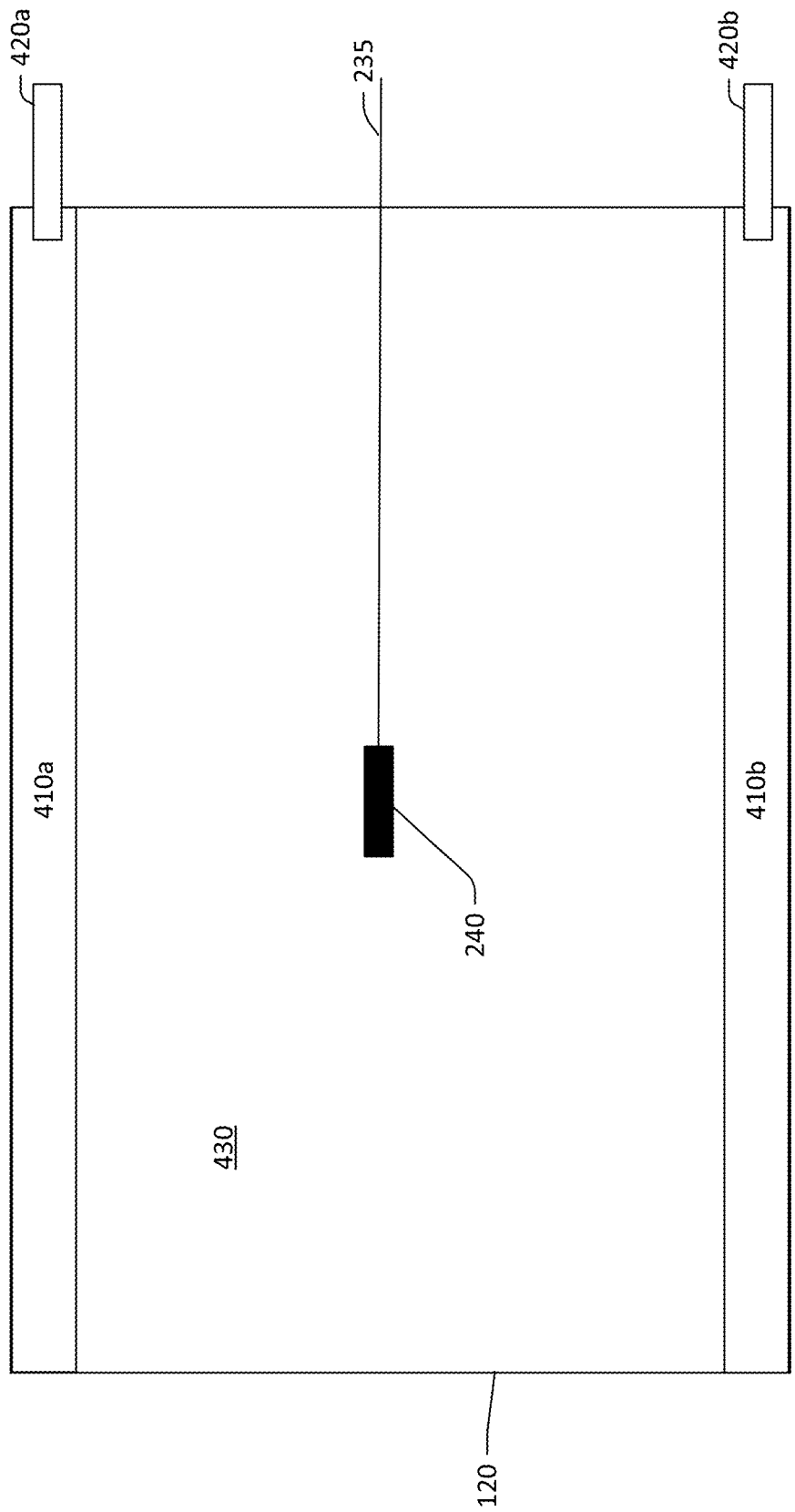
FIG. 4 illustrates an example veil.

FIG. 4 illustrates an example veil 120. In this example, the veil 120 includes a conductive material 430 and first and second bus bars 410a and 410b (e.g., copper) that electrically affixed to the conductive material 430. In an example, the first and second bus bars 410a and 410b provide rigidity to the conductive material 430. The first and second bus bars 410a and 410b approximately evenly distribute electrical current across the conductive material 430. Coupled to the first and second bus bars 410a and 410b are first and second electrodes 420a and 420b, respectively. In an example, the first and second electrodes 420a and 420b are soldered to the first and second bus bars 410a and 410b, respectively.

The first and second bus bars 410a and 420b are approximately rectangular in shape. However, the first and second bus bars 410a and 420b can be other shapes that include oval shaped bars, "Z" shaped bars, or any other shape that approximately evenly distribute electrical current across the conductive material 430. Long edges of the first and second bus bars 410a and 420b are aligning with long edges of the conductive material 430, with a length of the first and second bus bars 410a and 410b corresponding with a length of the conductive material 430. In an example, the first and second bus bars 410a and 420b are sized smaller than the length of the conductive material 430 and/or are disposed at positions away from the edges of the conductive material 430.

The temperature sensor 240 is affixed to the electrically conductive material that makes up the veil 120. The temperature sensor 240 can be affixed to the veil 120 at an approximate center location. This center location of the temperature sensor 240 allows the temperature sensor 240 to align with the anomaly 112 when the veil 120 is centered on the anomaly 112. The temperature sensor 240 is approximately flat to minimize distortion of a surface of a material stacked atop the temperature sensor 240. In an example, the first and second bus bars 410a and 410b, the first and second electrodes 420a and 420b, the temperature sensor 240, and the wire 235 are pre-fixed at a time of manufacture to the conductive material 430 to allow the veil 120 including its associated components to be easily disposed on the composite structure 110 and/or the adhesive layer 130. In an alternate example, the first and second bus bars 410a and 410b, the first and second electrodes 420a and 420b, the temperature sensor 240, and the wire 235 are affixed to the conductive material 430 in the field.

Figure 5:
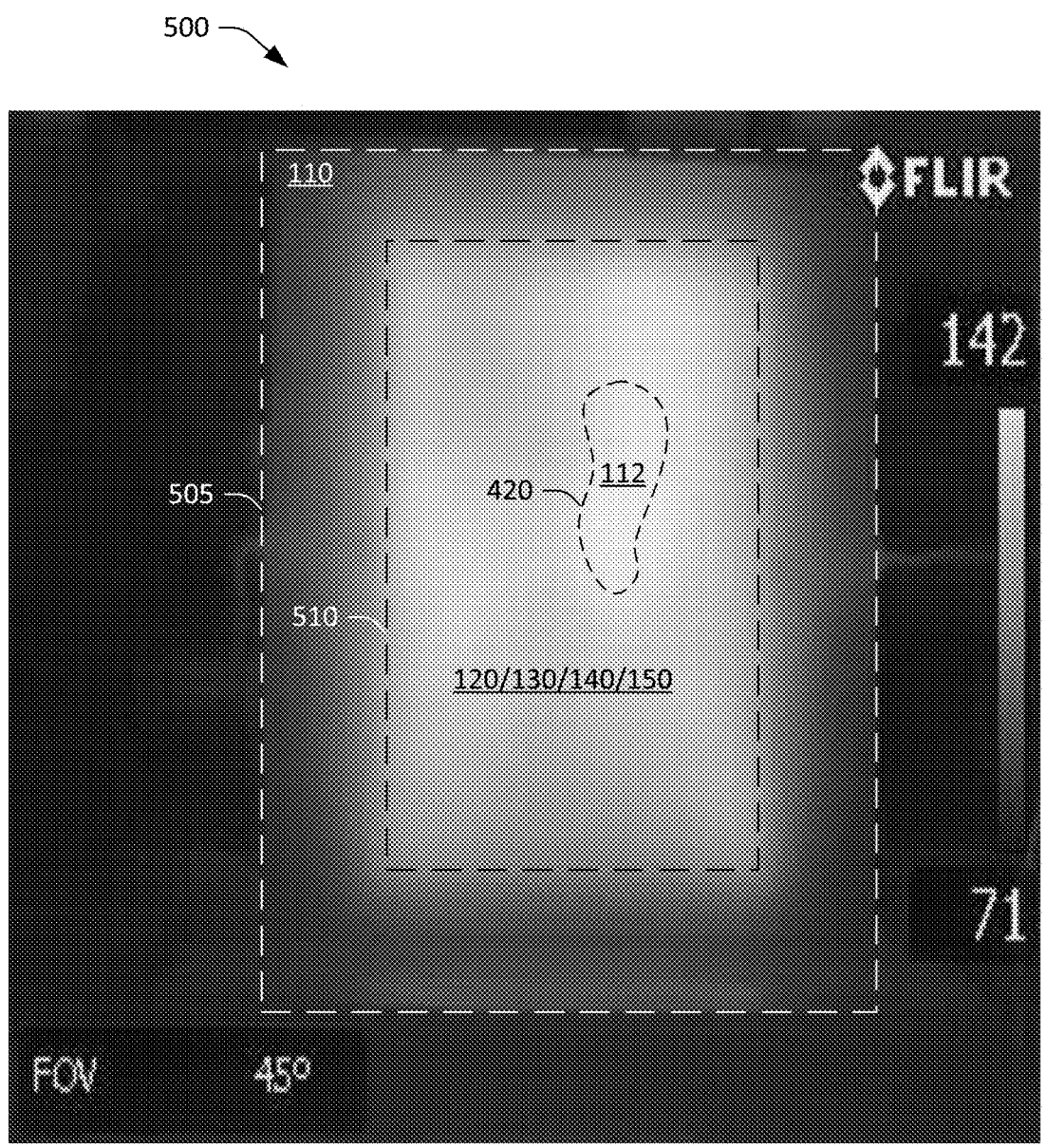
FIG. 5 illustrates an example thermography image that is produced from heat generated with the veil.

FIG. 5 illustrates an example thermography image 500 that is produced from heat generated with the veil 120. Subsequent to the use of the veil 120 to generate heat to repair the anomaly 112, the veil 112 may be used to generate heat to performed thermography imaging of the resultant repair of the composite structure 110. Upon applying electric power to the veil 120, the heat generated therewith raises a temperature within an area proximate to the veil 120. A thermographic camera (not shown) captures the thermographic image 400 that includes the repaired composite structure 110 and its repair components, i.e., the veil 120, the adhesive layer 130, an additional veil 140, and the composite patch 150. The thermographic image 400 graphically illustrates objects having a temperatures range between approximately 71 and 142 degrees Centigrade. The composite structure 110, illustrated within dotted area 505, outside an area covered by the repair components 120/130/140/150 remains at a lower temperature than an area that is heated by the veil 120. Thus, the composite structure 110 outside an area covered by the repair components 120/130/140/150 visually appears as a frame surrounding the repair components 120/130/140/150.

The area including the repair components 120/130/140/150 appears as a different color than its surroundings in the thermography image 500 due to the heat generated by the veil(s) 120/140, illustrated in dotted area 510. In FIG. 4, such an area is illustrated as a different shade of grey. Also, due to the uneven absorption of the heat by the anomaly 112, the anomaly 112 visually appears as a different color in the thermography image 500, illustrated in dotted area 420. In the FIG. 4, such an area is illustrated as another different shade of grey. Thus, the thermography image 500 allows a technician to perform a focused visual inspect of a quality of the resultant repair of the composite structure 110. A poor resultant repair will show uneven coloring outside of the anomaly 112 and within an area of the repair components 120/130/140/150. Moreover, because the veil(s) 120/140 remains within repair assembly 100 after repair of the anomaly 112, the veil(s) 120/140 allow for simplified future (e.g., monthly, yearly, etc.) inspection of the repair.

Figure 6:
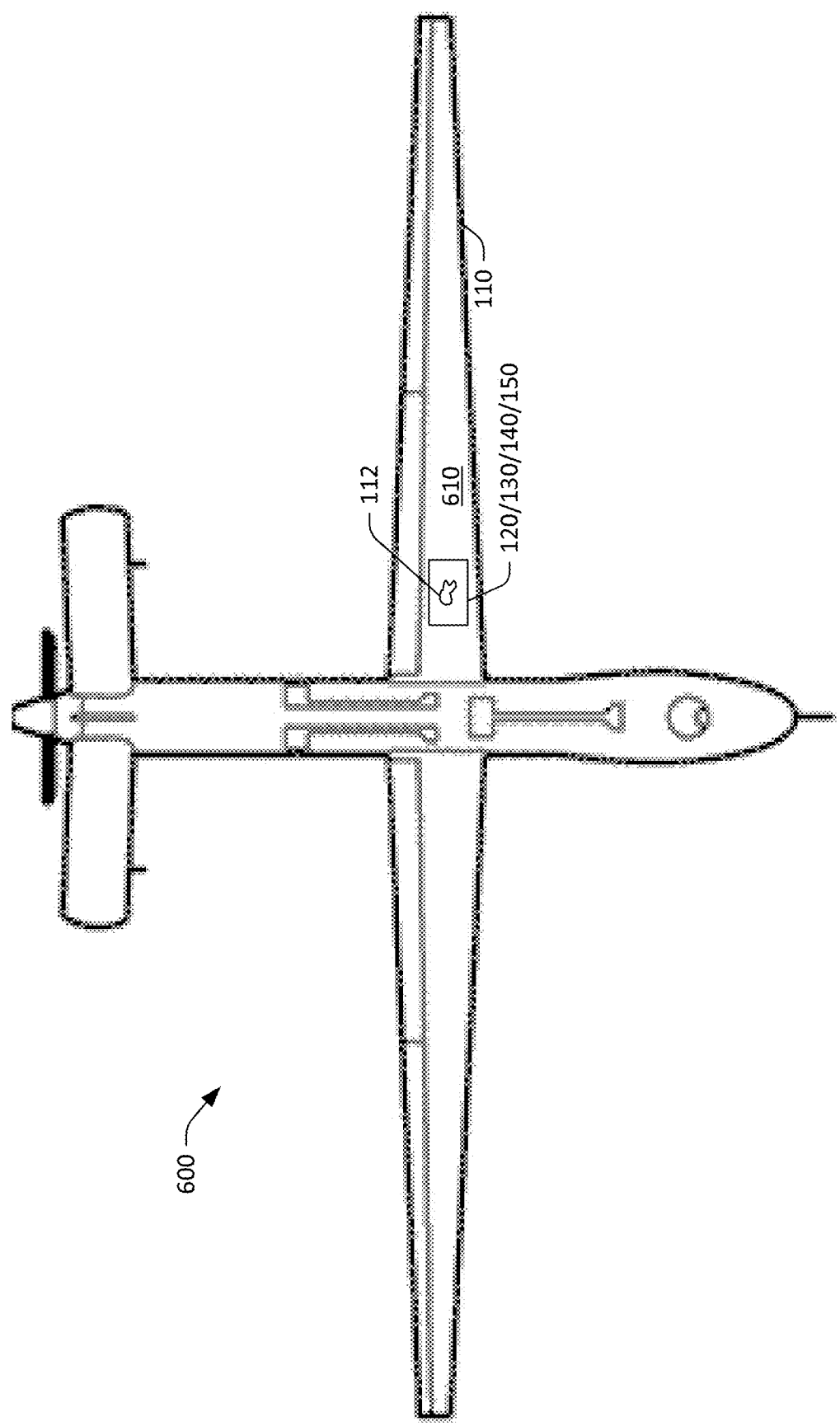
FIG. 6 illustrates an example application of the repair assembly to repair the composite structure of a drone.

FIG. 6 illustrates an example application of the repair assembly 100/180 to repair the composite structure 110 of a drone 600. The wing 610 of the drone 600 is constructed of the composite structure 110 (e.g., carbon fiber based composite), the wing 610 including the anomaly 112. The resultant repair structure that includes the veil 120, the adhesive layer 130, and the additional veil 140 is bonded to the anomaly 112, repairing the anomaly 112. Thus, the repair can be performed in-field, minimizing an amount of time that the drone 600 is removed from service. Moreover, the thermography image 500 can be generated in-field to allow for visual inspection of the repair to the drone 600, further minimizing the amount of time that the drone 600 is removed from service.

Figure 7:
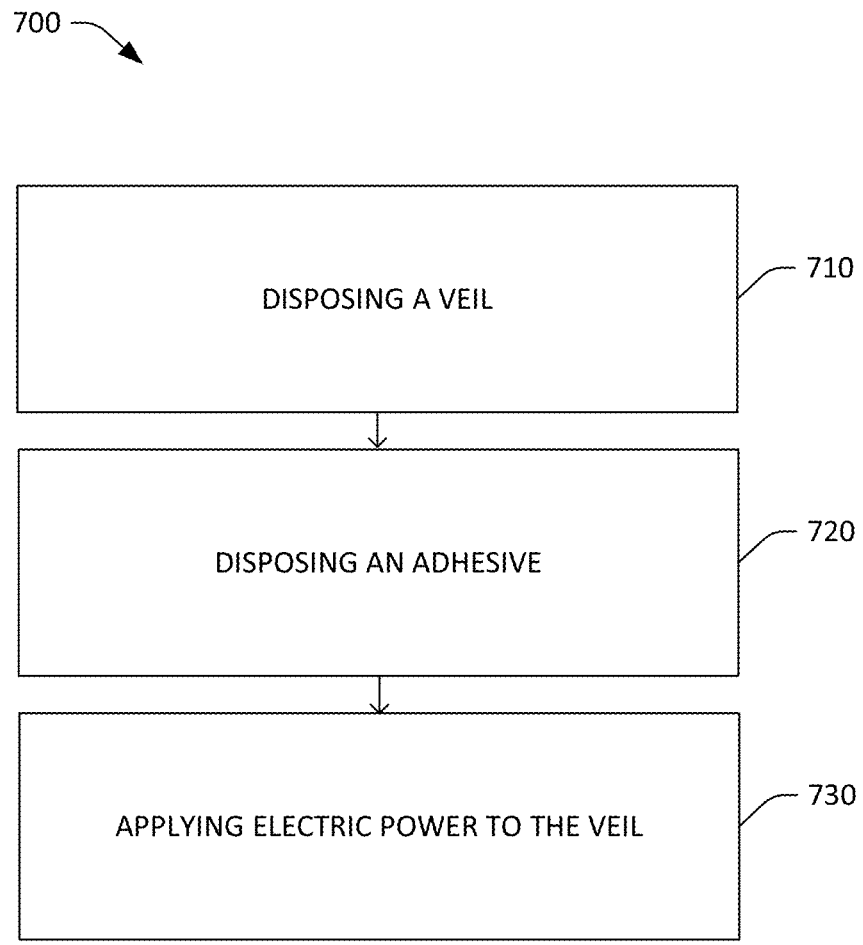
FIG. 7 illustrates an example method for repairing an anomaly.

In view of the foregoing structural and functional features described above, a method in accordance with various aspects of the present disclosure will be better appreciated with reference to FIG. 7. While, for purposes of simplicity of explanation, the method of FIG. 7 is shown and described as executing serially, it is to be understood and appreciated that the present disclosure is not limited by the illustrated order, as some aspects may, in accordance with the present disclosure, occur in different orders and/or concurrently with other aspects from that shown and described herein. Moreover, not all illustrated features may be required to implement a method in accordance with an aspect of the present disclosure.

FIG. 7 illustrates an example method 700 for repairing an anomaly 112. The method 700 begins at 710 in which the veil 120 is disposed. The veil 120 is disposed between the composite structure 110 that includes the anomaly 112 to be repaired and the composite patch 150. In an example, the method 700 further disposes the additional veil 140 between the composite structure 110 that includes the anomaly 112 to be repaired and the composite patch 150. In an example, this additional veil 140 is disposed on the adhesive layer 130.

At 720, the method 700 disposes an adhesive, e.g., the adhesive layer 130. The adhesive layer 130 is disposed between the composite structure 110 that includes the anomaly 112 to be repaired and the composite patch 150. In an example, the adhesive layer 130 is an adhesive sheet. In an example, the adhesive layer 130 is disposed on the veil 120. In another example, the adhesive layer 130 is pre-impregnated at a time of manufacture into the veil 120 or pre-impregnated at a time of manufacture into the composite patch 150. Once the veil(s) 120/140, the adhesive layer 130, and the composite patch 150 are disposed, a vacuum bag 250 is affixed to the composite structure 110 over the veil(s) 120/140, the adhesive layer 130, and the composite patch 150.

The method 700 further applies electric power to the veil(s) 120/140, at 730. The electric power is applied to the veil(s) 120/140 to generate heat between the composite structure 110 that includes an anomaly 112 to be repaired and the composite patch 150. The electric power is applied until the adhesive 130 is cured to repair the anomaly 112 in response to the heat being generated with the electric power being applied to the veil 120. In an example, the veil(s) 120/140 includes first and second bus bars 410a and 410b, with the electric power being applied to the first and second bus bars 410a and 410b, the first and second bus bars 410a and 410b distributing the electric power across the veil 120. The vacuum bag 250 maintains a vacuum over the veil(s) 120/140, the adhesive layer 130, and the composite patch 150 while the heat is generated with the electric power being applied to the veil 110.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A repair assembly, comprising:
   a composite patch to repair an anomaly within a composite structure;
   an adhesive disposed between the composite structure and the composite patch;
   a veil disposed between the composite structure and the composite patch, the veil generating heat in response to electric power being applied to the veil, with the adhesive being cured with the heat generated with the veil to repair the composite structure including the anomaly; and
   a temperature sensor disposed between the adhesive and the veil to accurately control curing of the adhesive.

2. The repair assembly of claim 1, wherein the adhesive is included in an adhesive sheet that is disposed between the composite structure that includes the anomaly to be repaired and the composite patch.

3. The repair assembly of claim 1, wherein the adhesive is pre-impregnated into the veil prior to the veil being disposed on the composite structure.

4. The repair assembly of claim 1, wherein the veil is a first veil, the repair assembly further comprising a second veil disposed on the adhesive to further generate heat with the electric power being applied to the second veil.

5. The repair assembly of claim 1, wherein the veil includes first and second bus bars to distribute the electric power across the veil.

6. The repair assembly of claim 1, wherein the composite structure and the composite patch are at least one of carbon based materials and fiberglass based materials.

7. The repair assembly of claim 1, further comprising a vacuum bag affixed to the composite structure over the veil, the adhesive, and the composite patch, the vacuum bag maintaining a vacuum over the veil, the adhesive, and the composite patch while the heat is generated with the electric power being applied to the veil.

8. The repair assembly of claim 1, further comprising electrodes coupled to the veil.

9. The repair assembly of claim 1, wherein the composite structure is a portion of an aircraft structure.

10. The repair assembly of claim 1, further comprising a curing controller to monitor a temperature of the veil and control the heat being generated with the electric power being applied to the veil in response to the monitored temperature.

\* \* \* \* \*